W. H. PARHAM.
VEHICLE TIRE FASTENER.
APPLICATION FILED MAY 21, 1920.
1,395,205.
Patented Oct. 25, 1921.
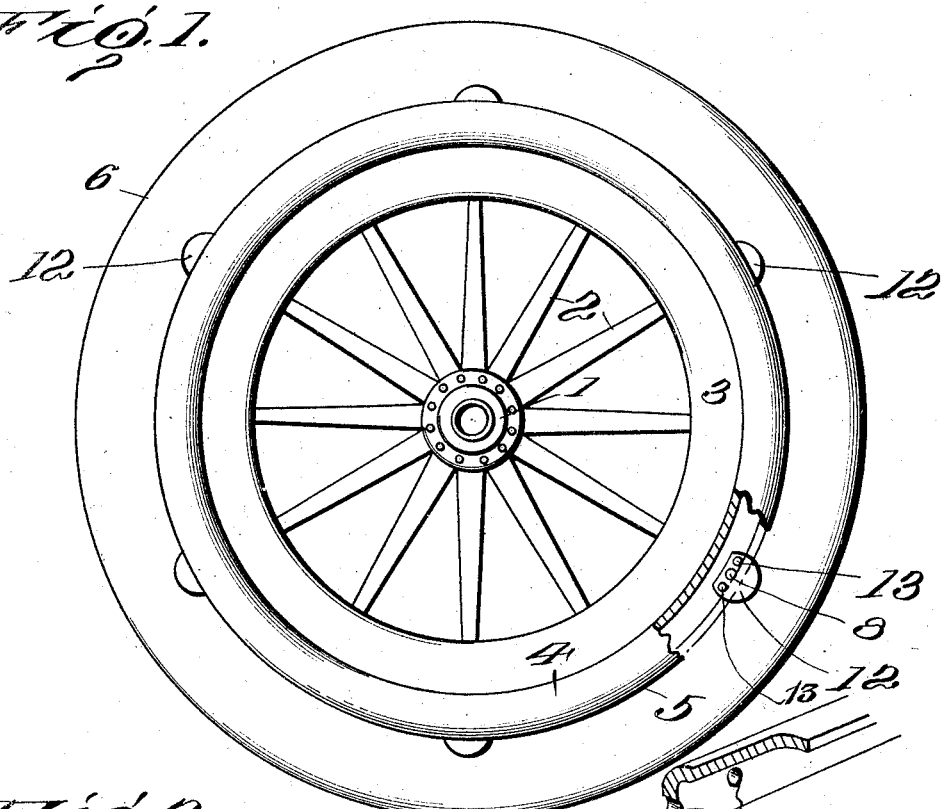
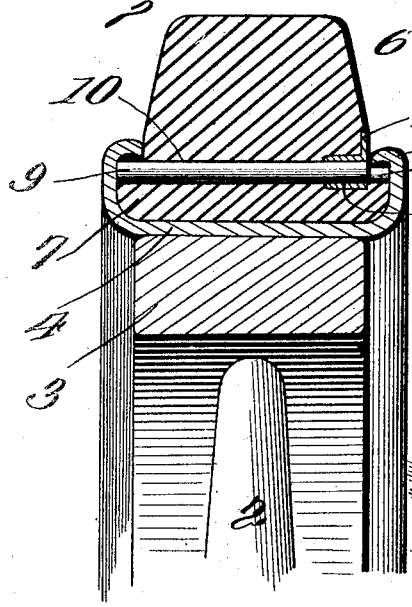
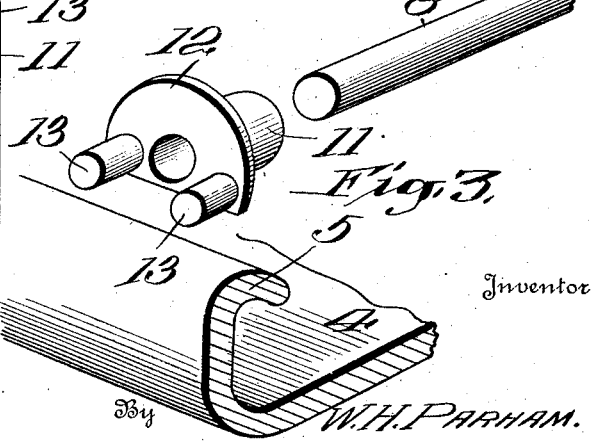
Inventor
W. H. PARHAM.
By
Attorney

UNITED STATES PATENT OFFICE.

WILLIAM H. PARHAM, OF KNOXVILLE, TENNESSEE, ASSIGNOR TO PARHAM AUTO PATENTS CORPORATION, OF KNOXVILLE, TENNESSEE, A CORPORATION OF DELAWARE.

VEHICLE-TIRE FASTENER.

1,395,205.   Specification of Letters Patent.   Patented Oct. 25, 1921.

Application filed May 21, 1920. Serial No. 383,121.

*To all whom it may concern:*

Be it known that I, WILLIAM H. PARHAM, a citizen of the United States, residing at Knoxville, in the county of Knox and State of Tennessee, have invented certain new and useful Improvements in Vehicle-Tire Fasteners, of which the following is a specification, reference being had therein to the accompanying drawing.

This invention relates to certain new and useful improvements in vehicle tire fasteners and more particularly to tire fasteners for solid and cushion tires, the object being to provide a fastening device which is so constructed that the tire can be readily inserted in position on the rim of the wheel or removed therefrom.

Another object of my invention is to provide a tire fastener which is exceedingly simple and cheap in construction and one which will hold the tire securely in position on the rim.

Another and further object of my invention is to provide a tire fastener composed of a pair of telescoping members in the form of a cross bar carried by the tire and adapted to extend into a groove of the channel rim in order to provide a positive fastening means for the tire.

A still further object of the invention is to provide a fastening device in which one of the telescoping members is held in locked position by the resiliency of the rubber of the tire, the same being so constructed that when pressure is applied to the tire the fastening device will be held securely in locked position so that all danger of the tire coming off of the rim when in use is prevented.

Other and further objects and advantages of the invention will be hereinafter set forth and the novel features thereof defined by the appended claims.

With these objects in view,

Figure 1 is a side elevation partly broken away of a vehicle wheel showing the application of my improved construction of tire fastener thereto.

Fig. 2 is a transverse section;

Fig. 3 is a perspective view of the fastening device and a portion of the rim;

Fig. 4 is a detail section through a slightly modifed form of rim.

In the drawing I have shown a wheel composed of a hub 1, spokes 2, felly 3 and rim 4, the rim being in the form of a channel having the free edges of the vertical walls turned down as shown at 5 to produce an annular groove and while I have shown a rim constructed in this particular manner I do not wish to limit myself to the particular construction of rim as I am aware that a channel rim having annular grooves in the walls of the channel can be constructed in various ways without departing from the spirit of my invention, one form being shown in my companion application Serial Number 383,122 filed even date herewith.

Arranged within the channel rim 4 is a rubber tire 6 of any of the well known constructions now in use having a base portion 7 preferably conforming in shape to the channel rim in which it is arranged and in constructing the tires they are preferably formed of a slightly greater width than the channel rim so that it is necessary to compress the same to insert the same in the rim but of course I do not wish to limit myself to the particular construction of tire.

In the various makes of solid and cushion tires now generally in use transverse bars or cross wires are arranged in the base of the tire and my invention consists in producing a cross bar or cross wire formed of a pair of telescoping members so that one of the members can be moved in respect to the other in order to allow the tire to be inserted within the rim.

I have shown a fastening device constructed of a cross bar 8 which is arranged transversely within the base of the tire 6 having one of its ends extended as shown at 9 and the bore 10 formed transversely in the base of the tire 6 at the opposite end is preferably enlarged as shown and adapted to receive the sleeve 11 of a member 12 which is slidably mounted on the bar 8 and is provided with pins 13 adapted to extend under the turned down portion of the rim into the groove formed thereby and it will be seen that the cross bar 8 and member 12 constitute a telescopic cross bar, one section of which is movable in respect to the other so that by the use of a suitable instrument the member 12 can be moved inwardly on the cross bar 8 against the resiliency of the rubber of the tire so that the same can be inserted within the channel rim and when released the same will be forced into the groove of the channel so that the projecting ends of the telescopic cross bar will rest within the grooves of the rim and securely fasten the tire in position. When it is desired to remove the tire a suitable instrument is placed in position so as to bear against the member 12 which moves the same inwardly on the cross bar 8 so as to draw the projecting pins out from under the overhanging portion of the channel rim. In the drawing I have shown a tire provided with six fastening members in the form of telescopic cross bars but it is of course understood that I do not wish to limit myself to the use of any number of these fastening devices as in some cases it may be necessary to increase the number and in other cases the number might be diminished. In the modification shown in Fig. 4 the rim A is provided with openings B to receive the ends of the sectional cross bar for preventing the tire from creeping when placed in position within the rim.

While I have shown a particular construction of fastening device I do not wish to limit myself to these details of construction as my invention consists broadly in providing a tire fastener formed of a pair of telescoping members embedded within the base of a resilient tire in such a manner that one of the sections of the fastening device can be moved in respect to the other in order to allow the tire to be inserted or removed.

In my companion application filed even date herewith I have shown and described means for preventing the tire from creeping on the rim by providing the channel rim with sockets to receive the free ends of the sectional cross bar and I am aware that the construction of fastener disclosed in this application could be used in connection with a channel rim having sockets as disclosed in my application filed May 21, 1920, Serial No. 383,122 or as illustrated in Fig. 4, and I do not wish to limit myself to the use of any particular construction of channel rim and my invention consists broadly in fastening a resilient tire in a rim by the use of a plurality of sectional cross bars embedded within the tire and held in extended position by the resiliency of the tire in such a manner that the tire is securely fastened thereon and yet is capable of being removed.

What I claim is:—

1. A tire fastener comprising a sectional cross bar embedded within the base of a resilient tire, one of said sections being provided with an enlargement engaged by the resilient tire for holding said section in extended position.

2. In a tire fastener, the combination of a channel rim provided with annular grooves, of a tire arranged within said channel rim and a plurality of telescopic cross bars embedded within the base of the tire having outwardly projecting ends extending into the grooves of the rim.

3. A tire fastener composed of a cross bar having a member slidably mounted on one end, said member having projecting pins.

4. In a tire fastener, the combination with a channel rim having annular grooves, of a resilient tire mounted in said channel rim, a cross bar arranged within the base of said tire having a projecting end and a member slidably mounted on said cross bar adapted to be normally held extended into the groove of said rim by the resiliency of said tire.

5. In a tire fastener, the combination with a channel rim having overhanging portions, of a resilient tire arranged within said rim, and transversely arranged fastening members carried by said tire, said members comprising telescoping sections having projecting ends adapted to be held under the overhanging portions of said rim by the resiliency of said tire.

6. In a tire fastener, the combination with a channel rim having overhanging portions, of a resilient tire on said rim, a cross bar embedded within the base of said tire having a projecting end, and a member slidably mounted on the opposite end of said bar having projecting pins adapted to be held under the overhanging portions of said rim by the resiliency of said tire.

7. In a fastening device for resilient tires, the combination with a channel rim having overhanging portions, of a resilient tire arranged within said rim having a plurality of sectional cross bars, each cross bar being formed of two sections, one section being slidably mounted in respect to the other, the slidably mounted section being provided with an instrument engaging member for moving said section into position for inserting or removing the tire from the rim.

In testimony whereof I have hereunto affixed my signature in the presence of two witnesses.

WILLIAM H. PARHAM.

Witnesses:
H. A. AURIN,
JOSEPH D. TRUAN.